United States Patent Office 2,895,873
Patented July 21, 1959

2,895,873

INORGANIC ANIMAL LITTER AND METHOD FOR MAKING THE SAME

Edgar W. Sawyer, Jr., Metuchen, and Wright W. Gary, Princeton, N.J., assignors to Minerals & Chemicals Corporation of America, Menlo Park, N.J., a corporation of Maryland No Drawing. Application September 20, 1957
Serial No. 685,093

16 Claims. (Cl. 167—42)

This invention relates to an improved inorganic litter for small animals and poultry and to a novel method of making the same.

The housing of small animals, particularly when several such animals are confined in a group, presents many well known difficulties relative to the disposal of animal droppings and the like. This disposal is ordinarily accomplished by bedding the animals in a litter capable of sorbing the liquid component of such droppings to a sufficient degree that the litter is useful for at least several days before noxious odors or physical breakdown of the litter requires its removal. A desirable litter is one that not only has high water sorptivity but also possesses: low degree of dusting; adequate crush strength so that the bodily movements of the animal do not pulverize it; high sorptivity for odors, particularly ammoniacal odors; self-sanitizing properties so that the litter is not a breeding ground for infection; non-toxic character, since many animals are prone to eat the litter and the droppings thereon; and ability to retain physical form in the presence of large quantities of moisture.

The use of granulated fuller's earth, diatomaceous earth and the like, heat treated to increase the hardness of the material and to destroy the colloidal properties thereof has been suggested in the prior art. Such materials, although possessing excellent sorptivity for liquids and adequate hardness, fail principally in their ability to occlude ammoniacal odors. Furthermore, the fuller's earth per se possesses no self-sanitizing properties and droppings from one diseased animal may be transferred to other animals caged together with the diseased animal by means of the organisms resident in the litter.

Accordingly, it is a principal object of the invention to provide an improved inorganic granular litter which inherently possesses substantial deodorizing capacity.

It is another object of the invention to provide an improved inorganic litter possessive of deodorizing and self-sanitizing properties.

It is a further object of the invention to teach a novel method for providing such improved litters.

Other objects will be apparent from a reading of a description of the invention and examples thereof which follow.

Briefly we have improved the deodorizing properties of certain sorptive aluminum-bearing siliceous mineral materials when used as a litter by reacting said mineral material with sulfuric acid to form in situ certain acidic salts which salts possess the ability to neutralize basic odors either originating in certain organic nitrogen compounds present in animal droppings or which are formed therefrom through decomposition. Furthermore, in an embodiment of the invention, the acid-treated mineral is rendered self-sanitizing by sorbing thereon small quantities of certain germicidal compound. A preferred type of germicide is the onium type of nitrogen compounds which have germicidal properties. The minerals surprisingly exhibit the ability to gradually release these onium compounds during use of such clays in a litter despite the well known fact that such onium compounds are ordinarily reactive with such minerals by a base-exchange mechanism thereby becoming rigidly bonded thereto and unavailable to perform their germicidal or bacteriostatic functions.

Litters prepared according to the practices herein taught are inexpensive, hard, relatively dust-free, self-sanitizing and deodorizing. When rabbits, whose urine is large in amount and high in ammonia forming materials, were confined in cages containing the novel litter of the invention, the cages were odorless after one week. Only the accumulation of substantially dry solid excrement in the cage required the litter to be discarded.

More specifically, the improved inorganic litter is prepared by reacting sulfuric acid with the aluminum and/or aluminum and other reactive components, such as magnesium, of a highly sorptive, non-colloidal granular siliceous mineral in which at least 5%, and preferably from about 10 to 25%, by volatile free (VF) weight (volatile free weight being the weight of the mineral after heating to essentially constant weight at about 1700° F.) is present as alumina, calculated as $Al_2O_3$. Suitable materials include sorptive mineral masses whose chief mineral constituent is an aluminum silicate, aluminum-magnesium silicate, or calcium-magnesium-aluminum silicate or mixtures thereof. Species include those clays including as mineral constituents attapulgite and certain montmorillonites which are sorptive and analyze at least 5%, and more preferably at least 10% of alumina. Small amounts of inert impurities, such as for example sand, or even acid reactive minerals of a non-sorptive character, such as for example hydrous aluminum silicates (clay minerals such a kaolinite, halloysite, etc.) or hydrous magnesium silicates or calcium silicates may be associated with the stock without adverse effect. However, where the impurity is of a non-sorptive character some of the desirable qualities of the litter will be somewhat diminished by the presence of that impurity. The raw minerals or clays are preferably rendered non-colloidal and hard prior to acid treatment by heating to a temperature sufficient to reduce the moisture content to about 3 to 10% without sintering or otherwise destroying the porosity of the mineral although it should be understood that raw clay sized by screening, etc. may be used since some hardening thereof will take place during the post-acid treatment calcination step. A particularly useful stock for the acid treatment is prepared by calcining at from about 700° to 1200° F. Attapulgus fuller's earth mined in Southwestern Georgia which contains as the principal mineral constituent attapulgite, a complex hydrated aluminum-magnesium-silicate. Such Attapulgus fuller's earth treated by the practices taught herein provides a highly sorptive, hard litter having substantial deodorizing and self-sanitizing properties. The following table shows some typical analyses of some commercial deposits of fuller's earth-type clays which are advantageously employed in the practice of the invention.

TABLE I

*Analyses of representative commercial deposits of fuller's earth*

| Analysis | Georgia-Florida | Texas | Illinois | Calif. | Utah |
|---|---|---|---|---|---|
| Free Moisture, Percent | 11.83 | -------- | 5.13 | 8.21 | -------- |
| Total Volatile Matter, Percent | 21.25 | 8.21 | 18.24 | 18.19 | 13.80 |
| Nonvolatile Matter (volatile-free basis), percent: | | | | | |
| $SiO_2$ | 67.68 | 62.87 | 70.74 | 66.02 | 75.17 |
| $Al_2O_3$ | 12.75 | 22.27 | 18.31 | 14.28 | 15.24 |
| $Fe_2O_3$ | 4.31 | 2.46 | 5.19 | 5.63 | 1.78 |
| $MgO$ | 11.60 | 1.21 | 2.65 | 8.61 | 4.32 |
| $CaO$ | 1.63 | 0.69 | 0.64 | 1.91 | 2.28 |
| $K_2O$ | 0.76 | 1.18 | 1.09 | 0.48 | 0.14 |
| $Na_2O$ | 0.12 | 0.17 | 0.19 | 0.18 | 0.25 |
| Undetermined | 1.15 | 0.74 | 1.19 | 2.89 | 0.82 |

The Georgia-Florida earth contains attapulgite as its chief mineral constituent whereas the other earths listed in Table I are composed essentially of montmorillonite minerals.

The clay, preferably heat-treated, is reacted with a 3 to 25 percent dosage, and preferably a 5 to 20 percent dosage of sulfuric acid, preferably concentrated sulfuric acid of 90 to 100 percent strength. Acid dosage is defined as the weight of 100 percent acid per weight of volatile-free clay expressed on a percentage basis, volatile-free clay being that which has been heated to essentially constant weight at 1700° F. Below about 3 percent dosage the amount of conversion to the sulfate of aluminum is not sufficient for the purposes of the invention and beyond about 20 percent dosage unreacted acid is lost during the reaction stage. Furthermore, beyond about a 25 percent dosage the water sorptivity level of the resultant litter is inadequate. We have experimentally found that the ammonia sorptivity of a calcined sorptive clay stock impregnated with magnesium sulfate is only a fraction of the ammonia sorptivity of the same stock impregnated with an equivalent dosage of aluminum sulfate. Hence, although some enhancement of this quality of the litter will be achieved by adding only sufficient acid to react with the magnesium of the stock and insufficient to react with the aluminum thereof, nevertheless the improvement in performance with animals is minimal. Concentrated acids such as the commercially available 66° Bé. (about 93 percent $H_2SO_4$) or oleum are preferred to more dilute acid since the conversion of the aluminum to its sulfate form is more complete by this practice. Furthermore, if dilute acid were used, excess liquid drained from the acid-clay mass would leach sulfate salts formed and remove these salts from the clay. If excess acid were not so removed the load on the calciner in which the clay-acid mass is reacted would be high. The exact acid dosage used in the preparation of any litter is best experimentally ascertained by routine experiments designed to measure at least the water sorptivity and ammonia sorptivity obtained when reacting a specific stock with a range of acid dosages. At any rate the acid dosage is advantageously one at which acid reacts with at least sufficient of the aluminum of said stock to give a product analyzing at least about 1 percent $Al_2(SO_4)_3$ based on the VF weight of the stock. The reaction of the acid with the acid reactible constituents of the minerals within the scope of the invention is a complex one and the relative reaction of the various cations of a specific mineral with the acid will vary for example with the state in which the cation exists in that particular mineral and the degree of subdivision of that mineral, temperature, etc. Hence the optimum acid dosage is ascertained by the performance in the field of the litter. We have observed that water sorptivity of stock is sacrificed with increase of acid dosage and this factor must be balanced against the higher ammonia absorption obtained with increasing dosage. The optimum temperatures of reacting the clay-acid mixture of the invention fall within the limits of from about 750° to 1100° F. and preferably from about 850° to 1000° F. and the optimum times within the range of from ½ to 3 hours. Below about 850° F. evolution of unreacted acid is incomplete and the reaction rate insufficient. Above about 1000° F. some decomposition of the metal salts takes place. The calcination should be carried out for a long enough period to complete the reaction and to drive off substantially all materials which are volatile within the temperature range.

The sequence of processing above recited is critical in the production of a satisfactory product, viz., the concentrated acid treatment is applied to a granular clay preferably previously heat-treated to substantially destroy the colloidal properties and to increase the hardness thereof and the acid-clay mixture is subjected to a heat-treatment at a temperature high enough to drive the reaction to completion yet inadequate to permit incipient decomposition of aluminum sulfate. The calcination of a colloidal clay-acid mass at temperature sufficient to completely destroy the colloidal properties of the clay would inherently decompose at least part of the desired sulfate salts. Furthermore, it is desirable that the heat-treated clay be granular rather than in larger lumps to facilitate the acid reaction. The term "granular" as used herein refers to particles less than about ½ to 1 inch and larger than about 10-mesh. Although the presence of free sulfuric acid entrained in the mineral mass would inherently possess the ability to pick up ammonia and/or lower amines resident in or generated by the animal droppings, nevertheless the presence of free acid is deleterious to the animals confined in the cage including the litter and is to be avoided. Hence the simple impregnation of the stock with sufficient free acid to react with such basic material does not provide a satisfactory litter. It is essential that the acidic constituent exist as a salt, particularly the aluminum salt and to a considerably lesser extent the magnesium salt, which salts are capable of forming complexes of undetermined constituent with such basic odoriferous material. These complexes have low vapor pressures and the offensive basic odors are effectively removed. The calcined granular clay stock should preferably include at least some relatively fine granules to improve the ability of the litter in use to sorb moisture of the droppings through capillary transfer, although presence of powdered material, that is material passable through a 325-mesh, introduces undesirable dust into the litter. Particularly suitable clay stocks have granules within the range of about 12/42, 12/30, 12/20 or substantially all 12-mesh material.

The reacted clay-acid mass is impregnated after cooling with a solution of a germicide to kill or inhibit not only those micro-organisms which decompose certain organic nitrogen compounds with resultant generation of odoriferous ammoniacal matter but also those organisms of a pathogenic nature. Particularly useful germicides include those commonly classified as "onium nitrogen compounds," the term referring to a group of organic compounds which are isologs of ammonium salts containing nitrogen in its pentavalent state. Species include quaternary ammonium compounds of trialkyl benzyl, tetraalkyl benzyl, trialkyl alkyl benzyl, and alkyl imidazoline salts, salts of pyridine, napthylamine, salts of the alkyl, dialkyl, trialkyl, and heterocyclic amines. Other germicides such as phenyl mercuric salts, and certain phenolic compounds may be used if the resultant composition does not exhibit excessive mammalian toxicity. From about 0.025 to about 3.0 parts of germicide is added to about 100 parts of clay (VF basis), suitably as a dilute solution. The germicide may be distributed on the mineral carrier by any means well-known in the art which insures adequate distribution although the solution spraying of a water-diluted germicide is the preferred technique.

It will be shown that the litters produced by the practice of our invention are superior in ammonia and water sorptivity to litters prepared by impregnating the same calcined stock with sufficient aluminum sulfate to give a somewhat similar aluminum sulfate analysis to both compositions. Furthermore, it has been found that the free acidity of the clay impregnated with alum approximates that of clay treated by the practice of the instant invention, probably because the ionized aluminum therein reacts with certain sites on the clay.

The following examples are given only for the sake of further illustrating our invention and are not to be construed as limiting the scope thereof.

Example I

Calcined acid impregnated Attapulgus fuller's earth was prepared using as stock a granular grade (12/42-mesh) of Attapulgus fuller's earth which had been previously calcined at about 700° to 800° F. for sufficient time to reduce the volatile-matter, to about 5 to 7 percent by VF weight. The chemical analysis (VF basis) of the stock expressed in terms of the oxides of the elements present, was as follows:

| | Percent |
|---|---|
| $SiO_2$ | 67.0 |
| $Al_2O_3$ | 12.5 |
| $MgO$ | 11.0 |
| $Fe_2O_3$ | 4.0 |
| $CaO$ | 2.5 |
| Others | 3.0 |
| | 100.0 |

The stock conveyed on a belt at 7.5 to 8 tons per hour was treated with a 15 percent dosage of 66° Bé. sulfuric acid by dripping acid onto the stock. The addition of the $H_2SO_4$ raised the temperature of the mass to about 135° F. The acid treated stock was passed through a calciner at 850° to 950° F. at an inlet rate of 7.5 to 8 tons per hour from which about 6.5 tons per hour of product was obtained.

After cooling overnight the calcined acid reacted material was impregnated by spraying thereon sufficient 5% Hyamine 1622 solution to give 0.3% of 100% Hyamine 1622 on the final product. Hyamine 1622 is p-di-iso-butylphenoxy-ethoxy-ethyl-dimethyl-benzyl ammonium chloride, made and sold by Rohm & Haas.

In Table II intermediate samples of litter are evaluated with respect to liquid sorptive capacity, ammonia sorptivity, free acid, percent sulfate and percent L.O.I. (loss on ignition at 1800° F.). The data herein indicates that optimum properties, that is high liquid and ammonia sorptivity and low free acid content are attained when a 15.8 percent acid dosage is used and the calcination temperature is about 880° F. for about an hour. All samples were taken 30 to 40 minutes after the temperature of the calciner had leveled off with the residence time noted above. The stock calcined at 1050° F. and dried at 300° F. had a liquid sorptive capacity of 8.4 cc. water/10 g. of stock.

The sorptivity of ammonia from a solution by various granular materials was accomplished by a test method performed under conditions to approximate those to which the litter is subjected in actual use.

Several 25.0 gram samples were placed in 2 oz. screw cap wide-mouth jars. A different volume (1 ml. increments) of ammonia solution (5% $NH_3$) was added to each jar and the jars were then tightly stoppered and allowed to remain at room temperature for 24 hours. The minimum volume of 5% ammonia solution required to produce a detectable ammonia odor after 24 was considered to be an indication of the ammonia sorptivity of the material. The capacity is expressed as grams $NH_3$/100 grams of litter material. The two figures given represent the highest concentration at which no odor was noted and the lowest concentration at which ammonia could be detected.

Free acid determination was made by the method described by Taylor and Basset, J. Chem. Soc. pp. 4431-42 (1952).

TABLE III

| | Parts/100 Parts Stock | Parts Oxides Converted to Sulfate/100 Parts Stock (Analyzed Values) | Parts of Sulfate Formed 100 Parts Stock (Calculated Values) | Percent of Constituent Reacted |
|---|---|---|---|---|
| $SiO_2$ | 67.0 | | | |
| $Al_2O_3$ | 12.5 | 1.04 | 3.43 | 10.0 |
| $MgO$ | 11.0 | 3.46 | 10.42 | 37.6 |
| $Fe_2O_3$ | 4.0 | 0.08 | | 2.9 |
| $CaO$ | 2.5 | 0.45 | 1.09 | 100.0 |
| Others | 3.0 | 0.006 | | 0.2 |
| Total | 100.0 | 10.4 | 14.9 | |

Example II

An analysis of the reaction products obtained by heating calcined Attapulgus fuller's earth stock (9% volatile matter) with a 15% sulfuric acid dosage and calcining the clay-acid mass for an hour at 1950° F. is included in Table III. It will be understood that the total amount of sulfates formed and distribution thereof vary considerably, inter alia, with volatile matter of the stock, acid dosage and calcination temperature. For example, it is certain that at least some sulfate was decomposed at the relatively high calcination temperature of 1050° F.; and that the total sulfate analysis and aluminum sulfate analysis would have been higher if the calcination temperature had been lower.

TABLE II

| Calcination Temp., ° F. | Percent Acid Dosage | Liquid Sorptive Capacity, TSM 121, cc. Water/10.g | Ammonia Sorptivity, g. $NH_3$/100 g. | Free Acid, percent as $H_2SO_4$ | Percent $SO_3$ (sulfate) | Percent L.O.I. |
|---|---|---|---|---|---|---|
| 1,000 | 15.2 | 7.7 | 1.4–1.6 | 0.34 | 5.16 | 10.7 |
| 880 | 15.18 | 7.7 | 2.4–2.6 | 0.43 | 8.12 | 14.5 |
| 780 | 16.3 | 7.0 | 2.8–3.0 | 0.57 | 8.13 | 16.8 |

Example III

To compare the properties of litter prepared by acid reacting the same clay stock as used in Example I with sufficient alum to leave resident on the clay an essentially equivalent amount of aluminum sulfate, an alum solution (11.15 pounds per gallon) was sprayed at a controlled rate onto the calcined Attapulgus fuller's earth stock simultaneously with the spraying of 0.03% of 100% Hyamine solution.

Ammonia sorptivity, liquid sorptivity and free acid were determined for: the stock, acid-treated and calcined material impregnated with 0.3% by weight of Hyamine, stock impregnated with sufficient 10% alum solution to give product having similar levels of aluminum sulfate and with 0.3% by weight of Hyamine. The results are tabulated in Table IV.

TABLE IV

| Clay | Added Material Dosage (All + 0.3% Hyamine) | Water Sorptivity, cc. H₂O/10 g. | Ammonia Absorption, g. NH₃/100 g. | Free Acid, percent SO₃ |
|---|---|---|---|---|
| Attapulgus Fuller's Earth Stock. | None | 8.4 | 0.0–0.2 | |
| Do | 12% H₂SO₄* | 6.41 | 2.2–2.4 | 0.610 |
| Do | 14% H₂SO₄* | 6.36 | 2.2–2.4 | 0.610 |
| Do | 15% H₂SO₄* | 6.20 | 2.2–2.4 | 0.436 |
| Do | 8% Al₂(SO₄)3.14H₂O | 5.70 | 1.2–1.4 | 0.24 |
| Do | 10% Al₂(SO₄)3.14H₂O | 5.14 | 1.2–1.4 | 0.32 |
| Do | 12% Al₂(SO₄)3.14H₂O | 5.26 | 1.6–1.8 | 0.35 |

*Calcined as in Example I.

The materials, except for the alum impregnated stock were prepared according to the process described in Example I and the testing methods were those previously described. It will be observed that the water sorptivity and ammonia absorption of acid reacted stock is higher than that of impregnated. It is also evident from the results that increasing acid dosage results in reduction in the water sorptivity of the litter, although within the range of acid dosage explored in the runs above recorded a concomitant increase in ammonia absorption is not reflected. The performance of a litter prepared by the practices taught herein was evaluated. The animals used for test purposes were rabbits; difficult animals to care for because of frequent cage cleaning requirements. The urine of rabbits is large in amount and high in ammoniacal content. In the test the animals are kept in rooms and housed in rack-type cages, twelve cages to the rack. Each cage, which is 18 x 18 x 15 inches, had at its bottom a pan 3 inches deep in which was contained about 3 pounds of litter. At the end of 7 days the room including the novel litter of the instant invention was still odorless.

It will be understood that the invention is susceptible to numerous variations and embodiments without departing from the spirit and scope thereof. For example, the litter prepared according to the teachings of our invention may be admixed with a diluent, preferably a granular sorptive diluent. Suitable granular sorptive diluents include diatomaceous earth, fuller's earth (attapulgite-type or montmorillonite-type), bauxite, sepiolite, etc. It will ordinarily be advantageous to treat thermally or otherwise process these diluent minerals to increase their hardness and to destroy substantially their colloidal properties thus preventing their loss of physical form in the presence of large quantities of moisture. Non-sorptive materials which may suitably be added as co-diluents with said sorptive diluents include sand, kalolin clays, talc and slag. The amount of diluent permissible will depend on the performance expected of the litter composite under particular conditions of use for a specific animal. For example, where the ammonia sorptivity requirement per unit of litter is high smaller quantities of diluent are indicated than when an animal bedded in the litter issues droppings of such a character that less ammonia sorptivity per unit of litter is needed. Furthermore, less diluent can be associated with a litter base prepared according to the practice of our invention in which a relatively low acid dosage is used than with a litter base prepared with a higher acid dosage to produce formulations having substantially equivalent ammonia sorptivity.

We claim:

1. An animal litter comprising a granular sorptive essentially non-colloidal clay mineral having an aluminum content, calculated as $Al_2O_3$, of at least about 5 percent based on the volatile free weight of said mineral, in which at least a portion of the aluminum therein exists as the sulfate salt formed in situ by the reaction of said mineral with sulfuric acid, said litter being characterized by being essentially devoid of free acid.

2. An animal litter comprising a granular sorptive essentially non-colloidal clay mineral having an aluminum content, calculated as $Al_2O_3$, of from about 10 to 25 percent based on the volatile free weight of said mineral, in which at least a portion of the aluminum therein exists as the sulfate salt formed in situ by the reaction of said mineral with a 3 to 25 percent dosage of concentrated sulfuric acid, said litter being characterized by being essentially devoid of free acid.

3. The animal litter of claim 2 including from about 0.025 to 3 percent of a non-toxic germicide sorbed thereon.

4. The animal litter of claim 2 including from about 0.025 to 3 percent of a germicidal onium nitrogen compound sorbed thereon.

5. An animal litter comprising granular calcined Attapulgus fuller's earth in which at least a portion of the aluminum therein exists as the sulfate salt formed in situ by the reaction of said fuller's earth with a 5 to 20 percent dosage of sulfuric acid, said litter being characterized by being essentially devoid of free acid.

6. The animal litter of claim 5 including from about 0.025 to 3 percent of a germicidal onium nitrogen compound sorbed thereon.

7. An animal litter comprising granular sorptive calcined montmorillonite clay having an alumina analysis of at least about 5 percent based on the volatile-free weight of said clay, in which at least a portion of the aluminum therein exists as the sulfate salt formed in situ by the reaction of said clay with a 3 to 25 percent dosage of sulfuric acid, said litter being characterized by being essentially devoid of free acid.

8. The method of making an animal litter which comprises mixing a granular highly-sorptive thermally-activated aluminum-bearing siliceous mineral with a dosage of sulfuric acid within the range from about 3 to 25 percent and, without washing any of the water soluble reactants from the mixture, heating said mineral-acid mixture to sufficient temperature to react said acid with at least a portion of said aluminum to form $Al_2(SO_4)_3$ in situ and eliminate substantially any unreacted acid without decomposing said $Al_2(SO_4)_3$.

9. The method of making an animal litter which comprises mixing a granular, highly-sorptive thermally-activated aluminum-bearing siliceous mineral, in which the aluminum, calculated as $Al_2O_3$, is present to the extent of at least about 5%, based on the volatile-free weight of said mineral, with a dosage of sulfuric acid within the range from about 5 to 20 percent and heating said mineral-acid mixture to 750–1100° F. for time sufficient to react said acid with at least a portion of said aluminum to form $Al_2(SO_4)_3$ in situ and remove substantially any unreacted acid without decomposing said $Al_2(SO_4)_3$.

10. The method of claim 9 in which said mineral is attapulgite.

11. The method of claim 9 in which said mineral is montmorillonite.

12. The method of claim 9 including the steps of: cooling said reacted acid-mineral mass and sorbing thereon from .025 to 1 percent by weight of a germicidal onium nitrogen compound.

13. The method of making an animal litter which comprises partially reacting a granular, thermally activated Attapulgus fuller's earth with a 10 to 15 percent dosage of sulfuric acid of 90 to 100 percent concentration and without washing any water soluble constituents therefrom heating said fuller's earth-acid mixture to about 1000° F. for time sufficient to completely react at least a part of the aluminum of said fuller's earth with acid to form $Al_2(SO_4)_3$ in situ and remove substantially all free acid without decomposing said $Al_2(SO_4)_3$.

14. The method of claim 13 including the additional steps of: cooling said reacted acid-mineral mass to ambient temperature and sorbing thereon from .025 to 1 percent by weight of a germicidal onium compound.

15. The method of making an animal litter medium which comprises reacting a highly sorptive magnesium-calcium-aluminum silicate mineral in which the aluminum, calculated as $Al_2O_3$, is present to the extent of at least 5% by weight of said mineral, volatile-free basis, which has been calcined at from 650 to 1200° F. to reduce the volatile matter to from about 3 to 10 percent by weight, with from 3 to 25 percent by weight of sulfuric acid of 90 to 100 percent concentration to react with at least a portion of the alumina of said clay to form $Al_2(SO_4)_3$ in situ and, without washing the water-soluble reactants from the mixture calcining said reacted clay mineral at from 850 to 1000° F. to eliminate free acid from said clay essentially without decomposing said $Al_2(SO_4)_3$.

16. The method of making an animal litter which comprises mixing a granular aluminum-bearing siliceous mineral with sulfuric acid, said aluminum-bearing siliceous mineral being capable of being rendered highly-sorptive and hard by heat treatment, and, without washing any of the water soluble reactants from the mixture, heating said mineral-acid mixture to about 850–1000° F. to react said acid with at least a portion of said aluminum to form $Al_2(SO_4)_3$ in situ and eliminate substantially any unreacted acid without decomposing said $Al_2(SO_4)_3$.

References Cited in the file of this patent

UNITED STATES PATENTS

| | | |
|---|---|---|
| 2,279,405 | Laughlin | Apr. 14, 1942 |
| 2,470,346 | Frankenhoff | May 17, 1949 |
| 2,649,759 | Gibbs | Aug. 25, 1953 |

OTHER REFERENCES

Watkins: "Handbook of Insecticide Dust Diluents and Carriers," Dorland Books, Caldwell, N.J., 1955, pp. 136–160, 200–214.

"Hyamines 1622 and 10–X," Rohm and Haas Co., Phila., Pa., 1947, page 2.

UNITED STATES PATENT OFFICE

CERTIFICATE OF CORRECTION

Patent No. 2,895,873                                    July 21, 1959

Edgar W. Sawyer, Jr., et al.

It is hereby certified that error appears in the printed specification of the above numbered patent requiring correction and that the said Letters Patent should read as corrected below.

Column 6, line 9, after "24" insert -- hours --; line 40, for "1950° F." read -- 1050° F. --.

Signed and sealed this 26th day of January 1960.

(SEAL)
Attest:

KARL H. AXLINE
Attesting Officer

ROBERT C. WATSON
Commissioner of Patents